Nov. 21, 1950 R. M. RANEY ET AL 2,530,539
STORAGE BATTERY
Filed April 12, 1947

INVENTOR.
ROBERT M. RANEY
BY VICTOR J. JONES
ATTORNEYS

Patented Nov. 21, 1950

2,530,539

UNITED STATES PATENT OFFICE 2,530,539

STORAGE BATTERY

Robert M. Raney, Euclid, and Victor J. Jones, Cleveland, Ohio, assignors to Willard Storage Battery Company, Cleveland, Ohio, a corporation of West Virginia Application April 12, 1947, Serial No. 741,008

4 Claims. (Cl. 136—177)

The present invention relates to batteries having a liquid electrolyte and requiring means for venting the same while in use and, more particularly, to secondary or storage batteries of the character referred to, especially those of the lead-acid type, the electrolyte and fumes of which may be explosive and will corrode most metals with which they come in contact.

One of the objects of the present invention is the provision of a novel and improved venting means for a battery having liquid electrolyte and separate filling and venting openings, which means will facilitate collection of the fumes produced during operation and their conduction to a place remote from the battery and is so constructed and arranged that it is inexpensive to manufacture and can be readily applied to or removed from the battery.

Another object of the present invention is the provision of a novel and improved venting means for a battery having liquid electrolyte, a filling opening for each cell which projects down into the cell to substantially the normal or desired electrolyte level, a venting opening for each cell separate from the filling opening, which venting means will collect and conduct to a place remote from the battery the fumes produced during operation and is so constructed and arranged that the individual venting openings of each cell may be closed during filling to prevent overfilling.

Another object of the invention is the provision of a battery having liquid electrolyte, a normally closed filling opening for each cell, and means separate from the filling openings for normally venting the battery, from which battery the electrolyte will not spill when the battery is inverted.

Another object of the invention is the provision of a battery having liquid electrolyte, a normally closed filling opening for each cell, means separate from the filling openings for normally venting the battery, and means for preventing overfilling of the battery, which battery is so constructed and arranged that the electrolyte will not spill therefrom when the battery is inverted even though one or more of the filling openings are left open.

Another object of the present invention is the provision of a novel and improved storage battery of the lead-acid type for use in airplanes, which battery has normally closed filling openings for each cell, in combination with means separate from the filling openings for normally venting the battery and conducting the gases produced to a place, for example, the outside of the airplane, where they will not corrode or otherwise injure the airplane or accumulate in a place where explosion might be possible, and which battery is so constructed and arranged that the electrolyte will not spill when the airplane is inverted even though the filling openings are left open.

Another object of the present invention is the provision of a novel and improved storage battery of the lead-acid type for use in airplanes, which battery has normally closed filling openings for the respective cells, means for normally venting the battery and conducting the gases produced to some desired location, for example, the outside of the airplane, where they will not corrode or otherwise injure the airplane or accumulate in a place where explosion might be possible, means for preventing overfilling, and which battery is so constructed and arranged that the electrolyte will not spill when the airplane is inverted even though one or more of the filling openings are left open.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which Fig. 1 is a plan view of a lead-acid type storage battery embodying the present invention, particularly adapted for airplane use;

Figure 1:
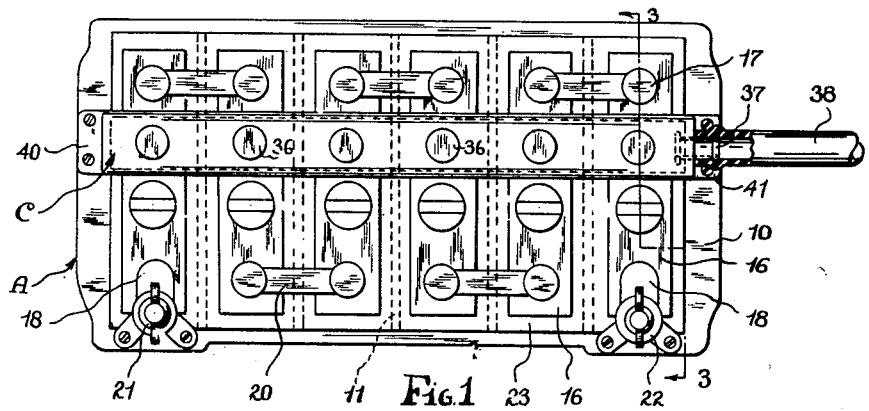

While the invention may be embodied in various types of batteries and manifolds, it is especially applicable to lead-acid type batteries used in airplanes, and is herein shown and described as embodied in such a battery. The battery may be of any conventional construction except as hereinafter pointed out. The battery illustrated in the drawings and described herein is a six cell, lead-acid type battery and only those parts are shown and described as are necessary to a complete understanding of the present invention. Obviously the invention is applicable to a battery having any number of cells.

Figure 3:
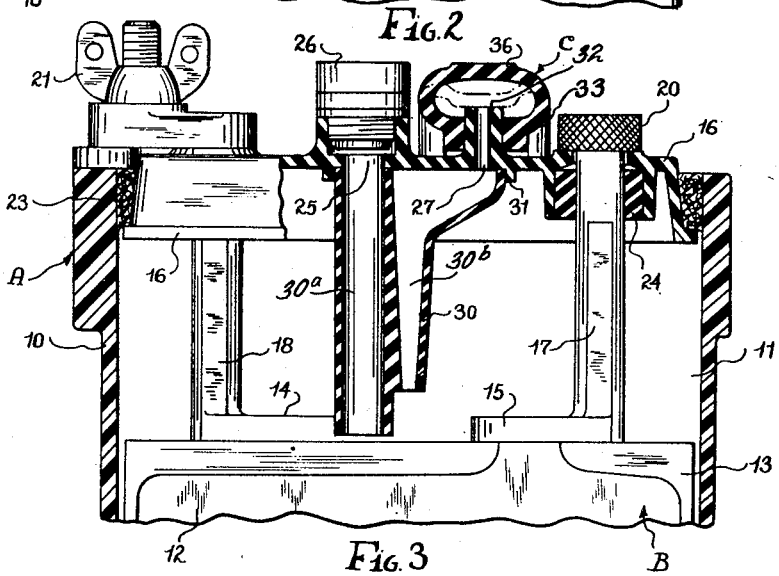
Fig. 3 is a sectional view approximately on the line 3—3 of Fig. 1.

Referring to the drawings, the battery shown therein and designated generally by the reference character A, includes a case 10 preferably formed of wood or molded, hard rubber and divided by transversely extending partitions 11 into six separate cell compartments, one for each of the battery elements B, only a part of one of which is shown in Fig. 3. Each of the battery elements is of conventional construction except that the posts are longer than is usually the case for a reason hereinafter apparent, and comprises groups of negative and positive plates alternately arranged and separated from one another by suitable separators. One of the negative plates and one of the separators can be seen in Fig. 3. They are designated 12 and 13, respectively. The positive and negative plates of each group are connected together in the conventional manner by positive and negative plate-connecting straps 14 and 15.

Each cell compartment of the case 10 is provided with a separate cover 16 and each of the plate-connecting straps is provided with an upstanding connector post or terminal post 17, 18, respectively, each of which projects upwardly through a suitable opening in the cover of the cell of which it forms a part. Positive and negative connector posts of adjacent cells are connected together by top connectors 20 and the two terminal posts 18 which are located at opposite ends of the battery have terminal members 21, 22 lead burned thereto. The terminal members form the terminals for connecting the battery to an electric circuit. The covers 16, as shown, are supported on the posts 17, 18 and are sealed to the case 10 by a sealing compound 23. The openings in the covers through which the posts 17, 18 project are sealed by rubber members 24.

In addition to the openings through which the connector posts and terminal posts 17, 18 project, each of the cell covers 16 is provided with two openings, one a filling opening 25 normally closed by a filler plug 26 of suitable construction and the other a venting opening 27. According to the provisions of the present invention, both openings are separately formed and communicate with or open into the interior of the cells at points approximately equally spaced from opposite sides of the cells and adjacent to the tops of the elements B which, in this instance, are spaced a considerable distance below the cell covers 16, thus necessitating the unusually long posts 17, 18. The case of the present battery is so constructed that the cell compartments are considerably deeper than ordinarily and the battery elements occupy only approximately the lower two-thirds or three-fourths of the cell compartment. The space above the bottom of the filling and venting openings is made large enough to hold all of the electrolyte in the cell compartments when the battery is inverted. This construction prevents electrolyte from spilling from the battery even though inverted and irrespective of whether or not the filling and venting openings are closed.

As shown, the filling and venting openings 25, 27 proper are extended into the interior of the cells by conduit means in the form of tubular members 30, each having two passageways or conduits 30a, 30b therethrough, one forming a part of the filling opening 25 and the other a part of the venting opening 27 of the cell in which they are located. The upper ends of the tubular members 30 are enlarged and of such shape that the conduits therein communicate with the upper parts of the filling and venting openings in the covers. The upper ends of the members 30 engage within recesses in the undersurfaces of the covers formed by flanges 31 and are cemented or otherwise securely fixed to the covers. Alternatively the filling and venting openings could be projected into the cell compartments by parts formed integral with the covers, in which event, the inwardly projecting members would probably be formed differently from that shown. As a further alternative construction, the inner parts of the filling and venting openings could be formed by separate tubular members, if desired. The cells are filled with their respective vent openings closed, therefore, the conduits 30a communicating with the filling openings 25 are slightly longer than the conduits 30b communicating with the venting openings 27 so that the venting conduits 30b will be above the electrolyte level after the liquid in the filling conduits 30a has drained into the cells upon opening of the venting openings subsequent to filling the battery. Obviously, where the feature of non-spillage of the electrolyte upon inversion of the battery is not necessary, as in batteries for automobiles or the like, the conduit means or members 30 may be omitted and the space above the battery plates in the cells will then be of less height as in conventional batteries.

The upper portions of the venting openings 27 are formed by upwardly projecting, cylindrical, tubular members 32 molded integral with the covers 16 and in communication with the interior of a manifold C by means of which the fumes produced during operation, which may be explosive and are corrosive to most metals, are collected prior to being conducted to some desired location; for example, the exterior of the airplane where they will not corrode or otherwise damage the airplane. The manifold C shown comprises a tubular-like member 33, the cross-sectional shape of which is generally oval and the lower wall of which is comparatively thick and provided with a plurality of apertures 34 into which the tubular members 32 project. The manifold is preferably made of resilient material and engages tightly about the tubular members 32. As shown, the manifold comprises inwardly extending flanges 35 adjacent to the lower ends of the apertures 34 to better grip the cylindrical members 32 and seal the connection therewith.

The top wall or upper portion of the manifold C, or, at least the portions above the upper ends of the venting openings 27, is resilient so that the manifold can be deformed, as indicated in dot-dash lines in Fig. 3, to close the upper ends of the venting openings 27 and thus prevent overfilling of the battery. Preferably the manifold is deformed to close the venting openings by a person pressing downwardly with his finger on that part of the manifold directly above the venting openings. As shown, the part of the manifold directly above the venting openings is thickened to form round, disk-like parts 36 so that a person may readily locate the place at which to apply the pressure, since to prevent overfilling of the battery it is necessary to close the venting openings of the cell to which the liquid is being applied and it is impossible to see whether or not the venting opening is properly closed.

As an alternative construction to that just described, the manifold, except the portions thereof opposite the upper ends of the venting openings, may be made of rigid material and secured over the venting openings in any suitable manner. In incorporating the invention in a multiple cell battery having a one-piece battery cover, the manifold could be formed integral with the cover and made of rigid material like the material of the cover except for the portions opposite or above the venting openings proper, which portions must be made movable so that the venting openings can be selectively closed. In the event the manifold is made of rigid material, the flexible parts above the venting openings may be made integral with the manifold or as separate members cemented or otherwise secured to the manifold. As a further alternative construction, the venting openings may be selectively closed by small plungers projecting through and slidably supported for limited movement in suitable apertures in a rigid manifold.

Figure 2:
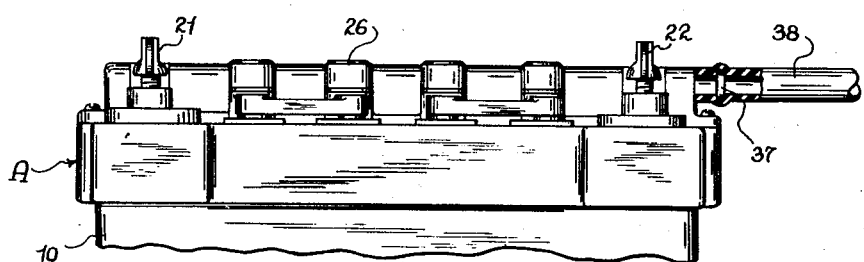
Fig. 2 is a side elevation of the battery shown in Fig. 1.
Figure 4:
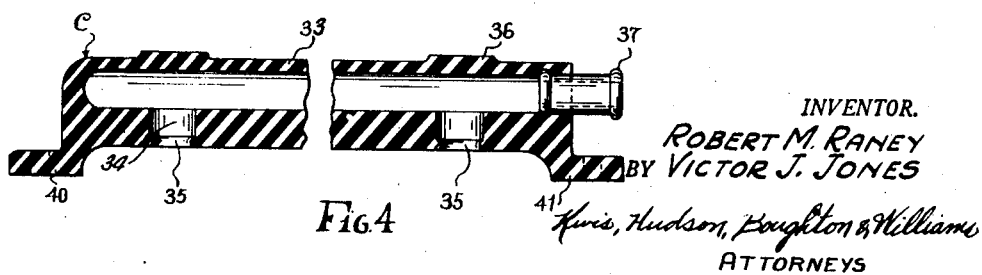
Fig. 4 is a fragmentary, longitudinal, sectional view of the manifold shown in the preceding figures.

In the embodiment shown, the left-hand end as viewed in Figs. 1, 2 and 4 of the manifold is closed, and the other end is provided with a nipple 37 for connection with a tube 38 of any desired length through which the fumes may be conducted to any desired location. As an alternative construction, the conduit or tube connected to the manifold for conducting the fumes away may be an integral part of the manifold and/or connected to the manifold at any convenient place other than that shown. Opposite ends of the manifold are preferably detachably connected to the battery proper and for this purpose the manifold C is provided with flanges 40, 41 at opposite ends thereof, which flanges are connected to the case 10 by suitable screws. As previously stated, the manifold C may be made of rubber or rubber-like material, including synthetic rubber; however, it may be made of any suitable material inert to the action of the electroylte and fumes with which it may come in contact.

While in the embodiment of the invention shown the venting openings of the respective cell may be selectively closed by deforming flexible parts of the manifold into engagement with the upper end of the members 32, the invention contemplates means other than making the manifold flexible for selectively closing the venting openings.

From the foregoing, it will be apparent that the objects of the invention heretofore enumerated and others have been accomplished and that there has been provided a novel and improved battery, including means for preventing overfilling of the cells, and which battery will not leak electrolye when inverted even though one or more of the filling openings may be left open. It will also be apparent that there has been provided a novel and improved manifold for a battery having venting openings separate and apart from the filling openings which can be readily applied to a battery after it has been otherwise manufactured.

While the invention has been described in considerable detail, it is not limited to the particular construction shown and it is our intention to cover hereby all adaptations, modifications and uses thereof which come within the practice of those skilled in the art to which the invention relates and within the scope of the appended claims.

Having thus described our invention, we claim:

1. In a multiple cell battery of the liquid electrolyte type, a case divided into separate cell compartments, cover means for said cell compartments, said cover means having a single venting opening and a separate filling opening therethrough for each cell compartment with the said openings for each cell adjacent each other, a movable imperforate member normally closing each of said filling openings, and a vent manifold extending over said venting openings exteriorly of said cover means and in communication with each of said venting openings thereby providing the only means of communication for the interior of said cells with the atmosphere, said manifold being flexible adjacent said venting openings so that portions of said manifold may be individually selectively distorted into a positicn closing the venting opening thereunder while adding liquid through the adjacent filling opening thereby controlling the filling of the cell whose venting opening is thus closed.

2. In a multiple cell battery of the liquid electrolyte type, a case divided into separate cell compartments, cover means for said cell compartments, said cover means having a single venting opening and a separate filling opening therethrough for each cell compartment with the said openings for each cell adjacent each other, a movable imperforate member normally closing each of said filling openings, and a vent manifold extending over said venting openings exteriorly of said cover means and in communication with each of said venting openings thereby providing the only means of communication for the interior of said cells with the atmosphere, said manifold being flexible adjacent said venting openings and including portions over the venting openings indicating the locations thereof so that the said portions may be individually selectively distorted into a position closing the venting opening thereunder while adding liquid through the adjacent filling opening thereby controlling the filling of the cell whose venting opening is thus closed.

3. In a multiple cell battery of the liquid electrolyte type, a case divided into separate cell compartments, cover means for said cell compartments, said cover means having a single venting opening and a separate filling opening therethrough for each cell adjacent each other, conduit means in each cell secured to the underside of said cover means around the filling and venting openings for the cell, the said conduit means having separate passageways therethrough in communication with the said filling and venting openings and extending downwardly in the cell substantially to the normal or desired level of the electrolyte therein, a movable imperforate member normally closing each of said filling openings, and a vent manifold extending over said venting openings exteriorly of said cover means and in communication with each of said venting openings thereby providing the only means of communication for the interior of said cells with the atmosphere, said manifold being flexible adjacent said venting openings so that portions of said manifold may be individually selectively distorted into a position closing the venting opening thereunder while adding liquid through the adjacent filling opening thereby controlling the filling of the cell whose venting opening is thus closed.

4. In a multiple cell battery of the liquid electrolyte type, a case divided into separate cell compartments, cover means for said cell compartments, said cover means having a single venting opening and a separate filling opening therethrough for each cell compartment, conduit means in each cell secured to the underside of said cover means around the said filling and venting openings for the cell, the said conduit means having separate passageways therethrough in communication with the said filling and venting openings and extending downwardly in the cell substantially to the normal or desired level of the electrolyte therein, a movable imperforate member normally closing each of said filling openings, and a vent manifold extending over said venting openings exteriorly of said cover means and in communication with each of said venting openings thereby providing the only means of communication for the interior of said cells with the atmosphere, said manifold being flexible adjacent said venting openings and including portions over the venting openings indicating the locations thereof so that the said portions may be individually selectively distorted into a position closing the venting opening thereunder while adding liquid through the filling opening of the cell whose venting opening is thus closed thereby controlling filling of the cell.

ROBERT M. RANEY.
VICTOR J. JONES.

REFERENCES CITED

The following references are of record in the file of this patent:

UNITED STATES PATENTS

| Number | Name | Date |
|---|---|---|
| 1,210,787 | Ford | Jan. 2, 1917 |
| 1,240,856 | Kammerhoff | Sept. 25, 1917 |
| 1,469,119 | Stallings | Sept. 25, 1923 |
| 2,141,621 | Setzer | Dec. 27, 1938 |
| 2,182,492 | Hall | Dec. 5, 1939 |
| 2,472,852 | Lighton | June 14, 1949 |

FOREIGN PATENTS

| Number | Country | Date |
|---|---|---|
| 470,233 | Great Britain | Aug. 11, 1937 |
| 482,949 | Great Britain | Apr. 5, 1938 |
| 538,129 | France | Mar. 14, 1922 |